United States Patent
Wu et al.

(10) Patent No.: US 11,702,493 B2
(45) Date of Patent: Jul. 18, 2023

(54) AQUEOUS POLYMER DISPERSION AND AQUEOUS COATING COMPOSITION COMPRISING THEREOF

(71) Applicants: Dow Global Technologies LLC, Midland, MI (US); Rohm and Haas Company, Collegeville, PA (US)

(72) Inventors: Yan Wu, Shanghai (CN); Baoqing Zheng, Shanghai (CN); Juan Zhao, Shanghai (CN); Shujun Shu, Shanghai (CN); Jia Tang, Shanghai (CN); Dong Yun, Shanghai (CN); Danniebelle Haase, New Castle, DE (US)

(73) Assignees: Dow Global Technologies, LLC, Midland, MI (US); Rohm and Haas Company, Collegeville, PA (US)

( * ) Notice: Subject to any disclaimer, the term of this patent is extended or adjusted under 35 U.S.C. 154(b) by 323 days.

(21) Appl. No.: 17/265,874

(22) PCT Filed: Sep. 28, 2018

(86) PCT No.: PCT/CN2018/108307
§ 371 (c)(1),
(2) Date: Feb. 4, 2021

(87) PCT Pub. No.: WO2020/062019
PCT Pub. Date: Apr. 2, 2020

(65) Prior Publication Data
US 2021/0292455 A1    Sep. 23, 2021

(51) Int. Cl.
| | | |
|---|---|---|
| C08F 220/18 | (2006.01) |
| C08F 220/28 | (2006.01) |
| C08F 230/02 | (2006.01) |
| C09D 125/14 | (2006.01) |
| C09D 133/10 | (2006.01) |
| C08J 3/07 | (2006.01) |
| C08F 212/08 | (2006.01) |

(52) U.S. Cl.
CPC ...... *C08F 220/1808* (2020.02); *C08F 212/08* (2013.01); *C08J 3/07* (2013.01); *C09D 125/14* (2013.01); *C09D 133/10* (2013.01); *C08J 2325/04* (2013.01); *C08J 2333/10* (2013.01)

(58) Field of Classification Search
CPC ............. C08F 230/02; C08F 220/1806; C08F 220/283
See application file for complete search history.

(56) References Cited

U.S. PATENT DOCUMENTS

| | | |
|---|---|---|
| 6,756,459 B2 | 6/2004 | Larson et al. |
| 2005/0137335 A1 | 6/2005 | Gray et al. |
| 2008/0269402 A1 | 10/2008 | Maurice et al. |
| 2014/0275388 A1* | 9/2014 | Rokowski ............... C04B 26/06 524/432 |

FOREIGN PATENT DOCUMENTS

| | | |
|---|---|---|
| CA | 2253922 | 11/1997 |
| CN | 104804118 | 7/2015 |
| DE | 69709859 | 9/2002 |
| WO | 1997043325 | 11/1997 |

* cited by examiner

*Primary Examiner* — Vu A Nguyen
(74) *Attorney, Agent, or Firm* — Karl E. Stauss; Cantor Colburn LLP

(57) ABSTRACT

An aqueous dispersion and an aqueous coating composition comprising the aqueous dispersion, and the aqueous coating composition providing coatings made therefrom with improved anti-corrosion property and good water resistance and block resistance.

15 Claims, No Drawings

AQUEOUS POLYMER DISPERSION AND AQUEOUS COATING COMPOSITION COMPRISING THEREOF

FIELD OF THE INVENTION

The present invention relates to an aqueous polymer dispersion and an aqueous coating composition comprising the same.

INTRODUCTION

Solvent borne coating compositions comprising epoxy resins, polyurethane, or alkyd resins are widely used in metal protective coatings due to their anti-corrosion performance, mechanical properties and appearance. Waterborne acrylic polymer dispersions have much less environmental concerns than solvent borne dispersions and are usually used for light to medium duty metal protection.

U.S. Pat. No. 6,756,459 discloses an aqueous coating composition comprising an aqueous emulsion copolymer that comprises as polymerized units, 55-58% of styrene, 35-37% of 2-ethylhexyl acrylate, 2.5-3% of methyl methacrylate, 2.5-3% of phosphoethyl methacrylate, 0-0.25% of methacryloxypropyltrimethoxysilane, and 0-3.5% of 2-(acetoacetoxy)ethyl methacrylate. Such aqueous emulsion copolymer can provide coatings with improved corrosion resistance when applied to metal substrates, for example, exhibiting no greater than 20% rust or a blister rating no greater than "M" after at least 7 days of exposure to salt spray according to ASTM B-117-97. For some coating applications, such as general industrial finishes and agriculture construction equipment coatings, it requires coatings with even better anti-corrosion performance to sustain at least 230-hour salt-spray testing at a dry film thickness of about 40-80 μm. Moreover, waterborne coatings in many applications are desired to have sufficient water-resistance and block resistance properties to meet industry requirements.

Therefore, there remains a need to provide an aqueous dispersion suitable for coating applications, which provides coatings with the above-described anti-corrosion as well as other desirable properties.

SUMMARY OF THE INVENTION

The present invention achieves the above-described anti-corrosion property by providing a novel aqueous dispersion. The aqueous dispersion of the present invention comprises an emulsion polymer prepared from a novel combination of monomers including a phosphorous acid monomer and/or a salt thereof, a cycloalkyl (meth)acrylate, an acetoacetoxy or acetoacetamide functional monomer, and a hydrophobic monomer. An aqueous coating composition comprising such aqueous dispersion can provide coatings made therefrom with improved corrosion resistance. The aqueous coating composition may also provide coatings with good early water resistance and/or satisfactory block resistance.

In a first aspect, the present invention is an aqueous dispersion comprising an emulsion polymer, wherein the emulsion polymer comprises, by weight based on the weight of the emulsion polymer, (a) structural units of a phosphorous acid monomer and/or a salt thereof, (b) from 5% to less than 40% of structural units of a cycloalkyl (meth)acrylate, (c) from 0.8% to 5% of structural units of an acetoacetoxy or acetoacetamide functional monomer, and (d) structural units of a hydrophobic monomer;

wherein the emulsion polymer has a weight average molecular weight of 160,000 g/mol or more.

In a second aspect, the present invention is a process of preparing the aqueous dispersion of the first aspect by polymerization process.

In a third aspect, the present invention is an aqueous coating composition comprising the aqueous dispersion of the first aspect.

DETAILED DESCRIPTION OF THE INVENTION

"Structural units", also known as "polymerized units", of the named monomer, refers to the remnant of the monomer after polymerization, that is, polymerized monomer or the monomer in polymerized form. For example, a structural unit of methyl methacrylate is as illustrated:

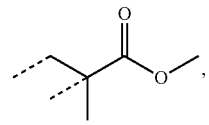

where the dotted lines represent the points of attachment of the structural unit to the polymer backbone.

"Acrylic" in the present invention includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$" as used herein, can be measured by various techniques including, for example, differential scanning calorimetry ("DSC") or calculation by using a Fox equation. For example, $T_g$ of an emulsion polymer comprising structural units of Monomers a, b, and c, is determined according to the following Fox equation:

$$1/T_g(\text{calc.}) = w(M_a)/T_g(M_a) + w(M_b)/T_g(M_b) + w(M_c)/T_g(M_c)$$

wherein $T_g(\text{calc.})$ refers to the glass transition temperature calculated for the polymer; $T_g(M_a)$, $T_g(M_b)$, and $T_g(M_c)$ refer to $T_g$ of the homopolymer of Monomer a, the homopolymer of Monomer b, and the homopolymer of Monomer c, respectively; and $w(M_a)$, $w(M_b)$, and $w(M_c)$ refer to the weight fraction of Monomer a, Monomer b, and Monomer c used for preparing the emulsion polymer, based on the weight of total monomers, respectively. The glass transition temperature of homopolymer may be found, for example, in "Polymer Handbook", edited by J. Brandrup and E. H. Immergut, Interscience Publishers.

The aqueous dispersion of the present invention comprises one or more emulsion polymers. The emulsion polymer useful in the present invention may comprise structural units of one or more phosphorous acid monomers and/or salts thereof. The phosphorous acid monomers and/or salts thereof may have an ethylenically unsaturation. The phosphorous acid monomers can be dihydrogen phosphate esters of an alcohol in which the alcohol contains or is substituted with a polymerizable vinyl or olefinic group. The phosphorous acid monomers may include phosphoalkyl (meth)acrylates such as phosphoethyl (meth)acrylate, phosphopropyl (meth)acrylate, phosphobutyl (meth)acrylate, salts thereof, and mixtures thereof; $CH_2=C(R)-C(O)-O-(R_pO)_n-P(O)(OH)_2$, wherein $R=H$ or $CH_3$, $R_p$=alkylene, such as an ethylene group, a propylene group, or a combination thereof; and n=1-20, such as SIPOMER PAM-100, SIPOMER PAM-200, SIPOMER PAM-300 and SIPOMER PAM-600 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and mixtures thereof. Preferred phosphorus acid monomers are selected from the group consisting of phosphoethyl methacrylate (PEM), phosphoethyl acrylate, allyl ether phosphate, or mixtures thereof; more preferably, phosphoethyl methacrylate. The emulsion polymer may comprise, by weight based on the weight of the emulsion polymer, 0.1% or more, 0.2% or more, 0.3% or more, 0.5% or more, 0.6% or more, 0.8% or more, 1.0% or more, 1.2% or more, 1.3% or more, 1.4% or more, or even 1.5% or more, and at the same time, 5% or less, 4.5% or less, 4% or less, 3.5% or less, 3.2% or less, 3% or less, 2.8% or less, 2.5% or less, 2% or less, or even 1.8% or less, of structural units of the phosphorous acid monomers and/or salts thereof. "Weight of the emulsion polymer" herein refers to the dry or solids weight of the emulsion polymer.

The emulsion polymer useful in the present invention may further comprise structural units of one or more cycloalkyl (meth)acrylates. Examples of suitable cycloalkyl (meth)acrylates include cyclohexyl (meth)acrylate, methcyclohexyl (meth)acrylate, isobornyl methacrylate, isobornyl acrylate, dihydrodicyclopentadienyl (meth)acrylate, trimethylcyclohexyl (meth)acrylate, t-butyl (meth)cyclohexyl acrylate, or mixtures thereof. Preferred cycloalkyl (meth) acrylate is cyclohexyl methacrylate, cyclohexyl acrylate, or a mixture thereof. The emulsion polymer may comprise, by weight based on the weight of the emulsion polymer, less than 40% of structural units of the cycloalkyl (meth)acrylate, for example, 5% or more, 6% or more, 7% or more, 8% or more, 9% or more, 10% or more, 11% or more, 12% or more, 13% or more, 14% or more, or even 15% or more, and at the same time, 40% or less, 39% or less, 38% or less, 36% or less, 35% or less, 32% or less, 30% or less, 28% or less, 25% or less, 24% or less, 22% or less, or even 20% or less of structural units of the cycloalkyl (meth)acrylate.

The emulsion polymer useful in the present invention may also comprise structural units of one or more acetoacetoxy or acetoacetamide functional monomers. The acetoacetoxy or acetoacetamide functional monomers are monomers having an ethylenically unsaturation and one or more acetoacetyl moieties represented by:

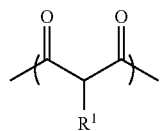

wherein $R^1$ is hydrogen, an alkyl having 1 to 10 carbon atoms, or phenyl.

Examples of suitable acetoacetoxy or acetoacetamide functional groups include

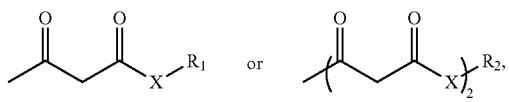

wherein X is O or N, $R_1$ is a divalent radical and $R_2$ is a trivalent radical, that attach the acetoacetoxy or acetoacetamide functional group to the backbone of the emulsion polymer.

Suitable acetoacetoxy or acetoacetamide functional monomers may include, for example, acetoacetoxyalkyl (meth)acrylates such as acetoacetoxyethyl methacrylate (AAEM), acetoacetoxyethyl acrylate, acetoacetoxypropyl methacrylate, acetoacetoxybutyl methacrylate, and 2,3-di(acetoacetoxy)propyl methacrylate; allyl acetoacetate; vinyl acetoacetate; acetoacetamidoalkyl (meth)acrylates such as acetoacetamidoethyl methacrylate and acetoacetamidoethyl acrylate; or combinations thereof. The emulsion polymer may comprise, by weight based on the weight of the emulsion polymer, 0.05% or more, 0.1% or more, 0.5% or more, 0.8% or more, 1% or more, 1.2% or more, 1.5% or more, 1.8% or more, 2% or more, 2.2% or more, or even 2.5% or more, and at the same time, 20% or less, 15% or less, 10% or less, 9% or less, 8% or less, 7% or less, 6% or less, 5% or less, 4.5% or less, or even 4% or less, of structural units of the acetoacetoxy or acetoacetamide functional monomer.

The emulsion polymer of the present invention may also comprise structural units of one or more hydrophobic monomers. "Hydrophobic monomers" refer to monomers having a calculated Hansch parameter >2.2. As used herein, the term "calculated Hansch parameter" for any molecule refers to parameters representing an index of polymer hydrophobicity, with higher values indicating greater hydrophobicity, as calculated according to the Kowwin methodology. A tool for this can be downloaded at http://www.epa.gov/oppt/exposure/pubs/episuitedl.htm. The Kowwin methodology uses a corrected "fragment constant" methodology to predict the Hansch parameter, expressed as log P. For any molecule, the molecular structure is divided into fragments each having a coefficient and all coefficient values in the structure are summed together to yield the log P estimate for the molecule. Fragments can be atoms but are larger functional groups (e.g. C=O) if the groups give a reproducible coefficient. The coefficients for each individual fragment were derived by multiple regression of reliably measured log P values (KOWWIN's "reductionist" fragment constant methodology), wherein the log P is measured by testing the fragment in a mixture of water and a given hydrophobic organic solvent. In the corrected fragment constant methodology, the coefficients of groups are adjusted by a correction factor to account for any differences between a measured log P coefficient value of a group and a log P for the same group that would result from summing the estimated log P coefficients from all atoms in the group alone. The KOWWIN calculation tool and estimation methodology were developed at Syracuse Research Corporation. A journal article by Meylan and Howard (1995) describes the program methodology as the "Atom/fragment contribution method for estimating octanol-water partition coefficients." *J. Pharm. Sci.* 1995, 84, 83-92. Hansch parameters can be calculated from coefficient values found at the website listed. Hansch parameters for common vinyl monomers are available from "Exploring QSAR: Volume 2: Hydrophobic, Electronic and Steric Constants", Hansch, C., Leo, A., Hoekman, D., 1995, American Chemical Society, Washington, D.C.

The hydrophobic monomer useful in the present invention may include styrene, substituted styrene, $C_4$-$C_{24}$-alkyl (meth)acrylates, or mixtures thereof. The $C_4$-$C_{24}$-alkyl (meth)acrylates refer to alkyl esters of (meth)acrylic acids containing alkyl with from 4 to 24 carbon atoms. The hydrophobic monomers preferably include styrene in combination of one or more $C_4$-$C_{12}$-alkyl (meth)acrylates. Suitable hydrophobic monomers may include, for example, styrene, substituted styrene such as alpha-methylstyrene, trans-beta-methylstyrene, 2,4-dimethylstyrene, ethylstyrene, butylstryene, and p-methoxystyrene; o-, m-, and p-methoxystyrene; and p-trifluoromethylstyrene; 2-ethylhexylacrylate, 2-ethylhexyl methacrylate, butyl methacrylate, tert-butyl methacrylate, tert-butyl acrylate, butyl acrylate, lauryl acrylate, lauryl methacrylate, or mixtures thereof. The emulsion polymer may comprise, by weight based on the weight of the emulsion polymer, 30% or more, 35% or more, 40% or more, 45% or more, 50% or more, 55% or more, or even 60% or more, and at the same time, 90% or less, 85% or less, 80% or less, 75% or less, 70% or less, or even 65% or less, of structural units of the hydrophobic monomers.

The emulsion polymer useful in the present invention may also comprise structural units of one or more additional acid monomers and/or salts thereof that are different from the phosphorous acid monomers and/or salts thereof described above. The additional acid monomers can be carboxylic acid monomers, sulfonic acid monomers, and mixtures thereof. The carboxylic acid monomers can be α, β-ethylenically unsaturated carboxylic acids, monomers bearing an acid-forming group which yields or is subsequently convertible to, such an acid group (such as anhydride, (meth)acrylic anhydride, or maleic anhydride); and mixtures thereof. Specific examples of carboxylic acid monomers include acrylic acid, methacrylic acid, maleic acid, itaconic acid, crotonic acid, fumaric acid, 2-carboxyethyl acrylate, and mixtures thereof. The sulfonic acid monomers may include sodium vinyl sulfonate (SVS), sodium styrene sulfonate (SSS) and acrylamido-methyl-propane sulfonate (AMPS); salts thereof; or mixtures thereof. Preferably, the additional acid monomer is the α, β-ethylenically unsaturated carboxylic acid, for example, acrylic acid, methacrylic acid, itaconic acid, or mixtures thereof. The emulsion polymer may comprise, by weight based on the weight of the emulsion polymer, from zero to 10%, from 0.5% to 5%, from 1% to 3%, or from 1.5% to 2%, of structural units of the additional acid monomers and/or salts thereof.

The emulsion polymer useful in the present invention may further comprise structural units of one or more multiethylenically unsaturated monomers including di-, tri-, tetra-, or higher multifunctional ethylenically unsaturated monomers. Examples of suitable multiethylenically unsaturated monomers include butadiene, allyl (meth)acrylates, divinyl benzene, ethylene glycol dimethacrylate, butylene glycol dimethacrylate, or mixtures thereof. The emulsion polymer may comprise, by weight based on the weight of the emulsion polymer, from zero to 5% of structural units of the multiethylenically unsaturated monomer, for example, 3% or less, 1% or less, 0.5% or less, or even zero.

The emulsion polymer useful in the present invention may also comprise structural units of one or more ethylenically unsaturated monomers having one or more functional groups selected from ureido, amide, amino, silane, hydroxyl, or combinations thereof (hereinafter "functional-group-containing monomers"). These functional-group-containing monomers may include, for example, amino-functional monomers such as dimethylaminoethyl methacrylate, dimethylaminoethyl acrylate, dimethylaminopropyl methacrylate, dimethylaminopropyl acrylate; monomers bearing amide-functional groups such as acrylamide and methacrylamide; vinyltrialkoxysilanes such as vinyltrimethoxysilane, vinyltriethoxysilane, vinyltris(2-methoxyethoxy)silane, vinyldimethylethoxysilane vinylmethyldiethoxysilane or (meth)acryloxyalkyltrialkoxysilanes such as (meth)acryloxyethyltrimethoxysilane and (meth)acryloxypropyltrimethoxysilane; ureido-functional monomers; hydroxyl-functional monomers such as 2-hydroxyethyl acrylate, 2-hydroxyethyl methacrylate, 2-hydroxypropyl methacrylate, and 3-hydroxybutyl methacrylate; or mixtures thereof. Preferred functional-group-containing monomers are ureido-functional monomers. As used herein, the term "ureido-functional monomers" refers to an ethylenically unsaturated compound comprising a cyclic ureido group (i.e., an imidazolidin-2-one group). Examples of suitable ureido-functional monomers include N-(2-Methacrylamidoethyl)ethylene urea, N-(2-Methacryloyloxyethyl) ethylene urea, N-(maleatoxy diethyl) ethylene urea, or mixtures thereof. Preferred ureido-functional monomers are cyclic-ureido-group-containing alkyl esters of (meth)acrylic acids, more preferably, N-(2-methacryloyloxyethyl) ethylene urea. The emulsion polymer may comprise, by weight based on the weight of the emulsion polymer, zero or more, 0.1% or more, 0.2% or more, 0.3% or more, 0.4% or more, 0.5% or more, 0.6% or more, or even 0.7% or more, and at the same time, 3% or less, 2.5% or less, 2% or less, 1.5% or less, 1.1% or less, 1% or less, 0.9% or less, or even 0.8% or less, of structural units of the functional group-containing ethylenically unsaturated monomers.

The emulsion polymer useful in the present invention may also comprise structural units of one or more additional ethylenically unsaturated nonionic monomers. "Nonionic monomers" herein refers to monomers that do not bear an ionic charge between pH=1-14. Suitable additional ethylenically unsaturated nonionic monomers may include, for example, $C_1$-$C_3$-alkyl (meth)acrylates such as methyl methacrylate, ethyl methacrylate, and ethyl acrylate; (meth)acrylonitrile, or mixtures thereof. The emulsion polymer may comprise, by weight based on the weight of the emulsion polymer, from zero to 10%, from 0.1% to 8%, from 0.5% to 6%, from 1% to 5%, from 2% to 4%, of the structural units of the additional ethylenically unsaturated nonionic monomers.

The emulsion polymer useful the present invention may comprise, by weight based on the weight of the emulsion polymer, from 0.5% to 3% of structural units of the phosphorous acid monomer and/or salt thereof, from 10% to 30% of structural units of the cycloalkyl (meth)acrylate, from 1.5% to 4% of structural units of the acetoacetoxy or acetoacetamide functional monomer, from 30% to 50% of structural units of styrene and substituted styrene, from 20% to 40% of structural units of $C_4$-$C_{12}$-alkyl (meth)acrylate, and from zero to 3% of structural units of the ethylenically unsaturated monomers having one or more functional groups selected from ureido, amide, amino, silane, hydroxyl, or combinations thereof.

Total weight concentration of the above structural units of the emulsion polymer may be equal to 100%. The types and levels of the monomers described above for preparing the emulsion polymer may be chosen to provide the emulsion polymer with a glass transition temperature (Tg) suitable for various applications. The $T_g$ of the emulsion polymer may be 0° C. or higher, 5° C. or higher, 10° C. or higher, 15° C. or higher, 20° C. or higher, 25° C. or higher, or even 30° C. or higher, and at the same time, 60° C. or less, 55° C. or less, 50° C. or less, 47° C. or less, 44° C. or less, or even 40° C. or less, as calculated by the Fox equation.

The emulsion polymer useful in the present invention may have a weight average molecular weight (Mw) of 160,000 g/mol or more, for example, 170,000 g/mol or more, 180,000 g/mol or more, 200,000 g/mol or more, 220,000 g/mol or more, 240,000 g/mol or more, 260,000 g/mol or more, 280,000 g/mol or more, 300,000 g/mol or more, or even 320,000 g/mol or more, and at the same time, 700,000 g/mol or less, 650,000 g/mol or less, 600,000 g/mol or less, 580,000 g/mol or less, 550,000 g/mol or less, 520,000 g/mol or less, 500,000 g/mol or less, 480,000 g/mol or less, 460,000 g/mol or less, 450,000 g/mol or less, 440,000 g/mol or less, 420,000 g/mol or less, 400,000 g/mol or less, 390,000 g/mol or less, or even 350,000 g/mol or less. Weight average molecular weight of the emulsion polymer may be measured by Gel Permeation Chromatography (GPC) with polystyrene standards as described in the Examples section below.

The aqueous dispersion of the present invention may further comprise one or more epoxy functional silanes. The epoxy functional silanes can be an epoxy functional polysiloxane oligomer, an epoxy functional silane compound, or mixtures thereof. The epoxy functional polysiloxane oligomers useful in the present invention are typically saturated epoxy functional polysiloxane oligomers. "Oligomer" herein refers to a polymer having a number-average molecular weight of from 100 to 3,000, from 300 to 2,000, or from 350 to 1,000. The number-average molecular weight (Mn) of the epoxy functional polysiloxane oligomers can be measured by GPC with polystyrene standards having molecular weights ranging from 580 to 19760 g/mol.

The epoxy functional polysiloxane oligomers useful in the present invention may have the structure of formula (I):

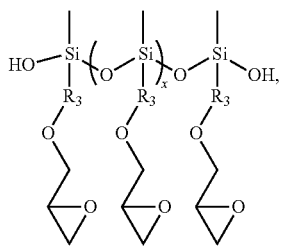

where x is from 0 to 14; preferably, from 0 to 4, from 1 to 4, or from 1 to 3; and $R_3$ is —$CH_2CH_2CH_2$—. Commercially available epoxy functional polysiloxane oligomers may include CoatOSil MP 200 polysiloxane oligomer available from Momentive Performance Materials Inc.

The epoxy functional silane compound useful in the present invention is typically a saturated alkoxylated silane having an epoxy group. The epoxy functional silane compound may have at least one hydrolysable silane group. A preferred epoxy functional silane compound has the general formula (II):

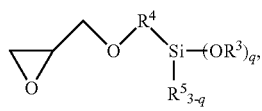

where each $R^3$ independently represents an alkyl group having one to 6 carbon atoms; each $OR^3$ group independently represents an alkoxy group having one to 6 carbon atoms including, for example, methoxy, ethoxy, or a combination thereof; $R^4$ represents a bivalent organic group having a molecular weight of 200 or less, preferably, $R^4$ is a $C_1$-$C_{10}$, $C_1$-$C_5$, or $C_1$-$C_3$ alkylene group; $R^5$ represents a hydrogen atom or an alkyl, aryl, or aralkyl group having one to 20 carbon atoms; and q is one, 2 or 3. Examples of suitable epoxy functional silane compounds include 3-glycidyloxypropyl trimethoxysilane, 3-glycidyloxypropyl triethoxysilane, 3-glycidyloxypropyl methyldiethoxysilane, 3-glycidyloxypropyl methyldimethoxysilane, or mixtures thereof. Commercially available epoxy functional silane compounds may include Silquest A-187 gamma-glycidoxypropyltrimethoxysilane from Momentive Performance Materials Inc.

The epoxy functional silanes useful in the present invention may be present in a combined amount of zero or more, 0.05% or more, 0.1% or more, 0.15% or more, 0.2% or more, 0.25% or more, 0.3% or more, or even 0.35% or more, and at the same time, 5% or less, 4% or less, 3% or less, 2.5% or less, 2% or less, 1.5% or less, 1.2% or less, 1% or less, 0.8% or less, or even 0.5% or less, by weight based on the weight of the emulsion polymer.

The aqueous dispersion of the present invention further comprises water, for example, in an amount of from 30% to 90%, from 40% to 80%, from 50% to 70%, or from 55% to 60%, by weight based on the total weight of the aqueous dispersion.

The aqueous dispersion of the present invention may be prepared by emulsion polymerization of a mixture of the monomers described above. Total weight concentration of the mixture of monomers for preparing the emulsion polymer is equal to 100%. The dosage of such monomer based on the total weight of the monomers, is substantially the same as the weight amount of each of these monomers as structural units in the emulsion polymer. The mixture of monomers may be added neat or as an emulsion in water; or added in one or more additions or continuously, linearly or nonlinearly, over the reaction period of preparing the polymer. Temperature suitable for free-radical polymerization process may be lower than 100° C., in the range of from 10° C. to 95° C., or in the range of from 50° C. to 90° C. One or more surfactants may be used in preparing the polymer. The epoxy functional silane may be added after the polymerization of the monomer mixture.

One or more radical initiators may be used in the polymerization process. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01% to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the proceeding acids. Metal salts of iron, copper, manganese, silver, platinum, vanadium, nickel, chromium, palladium, or cobalt may be used to catalyze the redox reaction. Chelating agents for the metals may optionally be used.

One or more chain transfer agents may be used in the polymerization process to control the molecular weight of the emulsion polymer. Examples of suitable chain transfer agents include 3-mercaptopropionic acid, methyl 3-mercaptopropionate, butyl 3-mercaptopropionate, n-dodecyl mercaptan, n-hexadecanethiol, tert-dodecyl mercaptan, n-octadecanethiol, benzenethiol, azelaic alkyl mercaptan, hydroxy group containing mercaptans such as hydroxyethyl mercaptan, mercaptopropionic acid, and mixtures thereof. The chain transfer agent may be used in an amount of from zero to 2%, for example, 1.5% or less, 1% or less, 0.5% or less, 0.3% or less, 0.2% or less, or even 0.15% or less, by weight based on the total weight of the monomers used for preparing the emulsion polymer.

After completing the polymerization, the obtained aqueous dispersion may be neutralized by one or more bases as neutralizers to a pH value, for example, at least 6, from 6 to 10, or from 7 to 9. The bases may lead to partial or complete neutralization of the ionic or latently ionic groups of the emulsion polymer. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof. The emulsion polymer particles in the aqueous dispersion may have a particle size of from 50 nanometers (nm) to 500 nm, from 80 nm to 200 nm, or from 90 nm to 150 nm, The particle size herein refers to Z-average size and may be measured by a Brookhaven BI-90 Plus Particle Size Analyzer.

The present invention also relates to an aqueous coating composition comprising the aqueous dispersion of the present invention. The aqueous dispersion may be present in the aqueous coating composition, by weight based on the weight of the aqueous coating composition, in an amount of from 20% to 90%, from 30% to 80%, or from 40% to 70%.

The aqueous coating composition of the present invention may further comprise pigments and/or extenders. "Pigments" herein refers to materials which are capable of materially contributing to the opacity or hiding capability of a coating. Such materials typically have a refractive index greater than 1.8. Inorganic pigments typically include metal oxides. Examples of suitable pigments include titanium dioxide ($TiO_2$), carbon black, zinc oxide, iron oxide, zinc sulfide, anticorrosive pigments such as zinc phosphate and zinc molybdate, carbon black, barium sulfate, barium carbonate and mixtures thereof. $TiO_2$ typically exists in two crystal forms, anastase and rutile. Suitable commercially available $TiO_2$ may include, for example, KRONOS 2310 available from Kronos Worldwide, Inc., Ti-Pure R-706 available from Chemours (Wilmington, Del.), TiONA AT1 available from Cristal, and mixtures thereof. $TiO_2$ may be also available in concentrated dispersion form. "Extender" herein refers to a particulate inorganic material having a refractive index of less than or equal to 1.8 and greater than 1.3. Examples of suitable extenders include calcium carbonate, clay, calcium sulfate, aluminum silicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, opaque polymers such as ROPAQUE™ Ultra E available from The Dow Chemical Company (ROPAQUE is a trademark of The Dow Chemical Company), and mixtures thereof. The aqueous coating composition may have a pigment volume concentration (PVC) of from 0% to 55%, from 5% to 40%, or from 10% to 35%. PVC may be determined according to the following equation:

$$PVC = \frac{\text{Volume of Pigment and extender}}{\text{Dry volume of the coating composition}} \times 100\%$$

The aqueous coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, alkyl polyacrylates and mixtures thereof. Suitable commercially available defoamers may include, for example, TEGO Airex 902 W and TEGO Foamex 1488 polyether siloxane copolymer emulsions both available from TEGO, BYK-024 silicone deformer available from BYK, and mixtures thereof. The defoamer may be present, by weight based on the total weight of the aqueous coating composition, generally in an amount of from zero to 5%, from 0.05% to 3%, or from 0.1% to 2%.

The aqueous coating composition of the present invention may further comprise one or more thickeners, also known as "rheology modifiers". The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is HEUR. The thickener may be present, by weight based on the total weight of the aqueous coating composition, in an amount of from zero to 5%, from 0.05% to 3%, or from 0.1% to 1%.

The aqueous coating composition of the present invention may further comprise one or more wetting agents. "Wetting agents" herein refer to chemical additives that reduce the surface tension of a coating composition, causing the coating composition to be more easily spread across or penetrate the surface of a substrate. Wetting agents may be polycarboxylates, anionic, zwitterionic, or non-ionic. Suitable commercially available wetting agents may include, for example, SURFYNOL 104 and SURFYNOL TG nonionic wetting agent based on an actacetylenic diol available from Evonik, BYK-346 and BYK-349 polyether-modified siloxanes both available from BYK, or mixtures thereof. The wetting agent may be present, by weight based on the total weight of the aqueous coating composition, from zero to 5%, from 0.05% to 3%, or from 0.1% to 2%.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescents may be present, by weight based on the total weight of the aqueous coating composition, from zero to 15%, from 0.5% to 8%, or from 2% to 5%.

The aqueous coating composition of the present invention may further comprise one or more dispersants. The dispersants can be polyacrylic acid or polymethacrylic acid or maleic anhydride with various monomers such as styrene, acrylate or methacrylate esters, diisobutylene, and other hydrophilic or hydrophobic comonomers; salts of thereof; and mixtures thereof. The dispersant may be present, by weight based on the total weight of the aqueous coating composition, in an amount of from zero to 5%, from 0.05% to 3%, or from 0.1% to 1%.

In addition to the components described above, the aqueous coating composition of the present invention may further comprise any one or combination of the following additives: buffers, neutralizers, humectants, mildewcides, biocides, anti-skinning agents, colorants, flowing agents, anti-oxidants, plasticizers, leveling agents, adhesion promoters, anti-flash rust additives, and grind vehicles. These additives may be present in a combined amount of from zero to 10% or from 0.1% to 2%, by weight based on the total weight of the aqueous coating composition. The aqueous coating composition may also comprise water in an amount of from 30% to 90%, from 40% to 80%, or from 50% to 70% by weight of the aqueous coating composition.

The aqueous coating composition of the present invention may be prepared by a process comprising: admixing the aqueous dispersion with other optional components, e.g., pigments and/or extenders as described above. Components in the aqueous coating composition may be mixed in any order to provide the aqueous coating composition of the present invention. Any of the above-mentioned optional components may also be added to the composition during or prior to the mixing to form the aqueous coating composition. When the aqueous coating composition comprises pigment and/or extender, the pigments and/or extenders are preferably mixed with the dispersant to form a slurry of pigments and/or extender.

The aqueous coating composition of the present invention can provide coatings made therefrom with improved corrosion resistance. The present invention also provides a method of improving corrosion resistance of a corrosion susceptible substrate, such as metal. The method comprises: providing the aqueous coating composition of the present invention, applying the aqueous coating composition to a metal substrate, and drying, or allowing to dry, the aqueous coating composition to form a coating. Improved corrosion resistance means surface rusted rating of 10 and blister rating better than 6M for a coating with a thickness of 40-80 µm, after exposure to salt spray for at least 48 hours, at least 100 hours, at least 230 hours, at least 240 hours, at least 250 hours, at least 270 hours, at least 340 hours, or at least 400 hours, according to the test method described in the Examples section.

The present invention also relates to a process of using the aqueous coating composition of the present invention. The process may comprise: applying the coating composition to a substrate, and drying, or allowing to dry, the applied coating composition. The present invention also provides a method of preparing a coating. The method may comprise forming the aqueous coating composition of the present invention, applying the aqueous coating composition to a substrate, and drying, or allowing to dry, the applied coating composition to form the coating.

The aqueous coating composition of the present invention can be applied to, and adhered to, various substrates. Examples of suitable substrates include wood, metals, plastics, foams, stones, elastomeric substrates, glass, fabrics, concrete, or cementitious substrates. The aqueous coating composition, preferably comprising the pigment, is suitable for various applications such as marine protective coatings, general industrial finishes, metal protective coatings, automotive coatings, traffic paint, Exterior Insulation and Finish Systems (EIFS), wood coatings, coil coatings, plastic coatings, can coatings, architectural coatings, and civil engineering coatings. The aqueous coating composition is particularly suitable for metal protective coatings. The aqueous coating composition can be used as a primer, a topcoat, as one-coat direct-to-metal coating, or in combination with other coatings to form multi-layer coatings.

The aqueous coating composition of the present invention can be applied to a substrate by incumbent means including brushing, dipping, rolling and spraying. The aqueous composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous coating composition of the present invention has been applied to a substrate, the aqueous coating composition can dry, or allow to dry, to form a film (this is, coating) at room temperature (20-35° C.), or at an elevated temperature, for example, from 35 to 240° C.

EXAMPLES

Some embodiments of the invention will now be described in the following Examples, wherein all parts and percentages are by weight unless otherwise specified.

Cyclohexyl methacrylate (CHMA) is available from BASF.

Styrene (ST) is available from Langyuan Chemical Co., Ltd.

2-Ethylhexyl acrylate (2-EHA) is available from The Dow Chemical Company.

Methacrylic acid (MAA) is available from Sinopharm Chemical Reagent Co., Ltd.

Phosphoethyl methacrylate (PEM) is available from Solvay.

N-(2-Methacryloyloxyethyl) ethylene urea (MEUR) is available from Evonik.

Acetoacetoxyethyl methacrylate (AAEM) is available from Eastman.

Diacetone acrylamide (DAAM) and adipic dihydrazide (ADH) are both available from Kyowa Hakko Chemical Co., Ltd.

n-Dodecyl mercaptan (n-DDM), available from Sinopharm Chemical Reagent Co., Ltd., is used as a chain transfer agent.

POLYSTEP P-12A surfactant (P-12A), available from Stepan Co., is an alcohol ethoxylate based phosphate surfactant.

Disponil FES 32 surfactant (Fes 32), available from BASF, is an alcohol ethoxylate sulphate surfactant.

Silquest A-187 silane (A-187), available from Momentive Performance Materials, is glycidoxy propyltrimethoxysilane.

ACRYSOL™ RM-8W rheology modifier, available from The Dow Chemical Company, is a nonionic urethane rheology modifier.

OROTAN™ 681 dispersant, available from The Dow Chemical Company, is a hydrophobic acrylic copolymer pigment dispersant.

Ti-Pure R-706 pigment, available from Chemours Titanium Technologies, is a titanium dioxide pigment.

SURFYNOL TG nonionic wetting agent and TEGO AIREX 902W defoamer (an emulsion of a polyether siloxane copolymer, containing fumed silica) are both available from Evonik.

TEXANOL ester alcohol, available from Eastman, is used as a coalescent.

Ammonia (25%) neutralizer and $NaNO_2$ anti-flash rust agent are both available from Sinopharm Chemical Reagent Co., Ltd.

Sodium nitrite (15%) is used as an anti-flash rust additive.

OROTAN, TRITON and ACRYSOL are all trademarks of The Dow Chemical Company.

The following standard analytical equipment and methods are used in the Examples.

Salt Spray Resistance Test

Coated panels were prepared by applying a test coating formulation onto Q panels (cold rolled steel) by a 100 μm applicator. The resultant film was then allowed to dry at 23° C. and relative humidity (RH) of 50% for 7 days. Salt spray resistance properties were tested by exposure of the as prepared coated panels to a salt spray environment (5% sodium chloride fog) in accordance with ASTM B-117 (2011). Exposed cold rolled steel was covered with tape (3M plastic tape #471) prior to exposure. A scribe mark made with a razor blade may be scratched into the bottom half of the panels obtained above immediately before exposure. For each formulation, one panel with scribe ("scribed panel") and one panel without scribe ("non-scribed panel") were exposed to the salt spray environment for certain hours, and then moved from the salt spray environment to rate blister and rust. For example, the non-scribed panels were rated after 230-270 hours and the scribed panels were rated after 400 hours. Results were presented as blister/rust ratings.

Blister ratings were conducted in accordance with ASTM D714-02 (2010) and comprised a number and/or one or more letters, as shown in Table A. The letter F, M, MD or D is a qualitative representation of the density of blisters. The number refers to the size of the blister, whereby 2 is the largest size, 8 is the smallest size, and 10 is no blister. The bigger the number, the smaller the size of blister. Rust ratings are determined by ASTM D610-2001, as shown in Tables B and C. The acceptable blister rating is better than 6M and the acceptable rust rating is "10" after 230-270 hours of exposure to salt spray salt.

TABLE A

Blister rating criteria

| Density of blister | Abbreviation | Size of Blister | Rating |
| --- | --- | --- | --- |
| Few | F | Very Big blister | 2 |
| Medium | M | Big blister | 4 |
| Medium dense | MD | Small to middle blister | 6 |
| Dense | D | Smallest blister seen by unaided eye | 8 |
|  |  | No blister | 10 |

TABLE B

Rust Rating by rusting degree

| Rusting degree | Rating |
| --- | --- |
| Spots | S |
| General | G |
| Pin point | P |

TABLE C

Rust Rating by surface rusted percentage

| Surface Rusted | Rating |
| --- | --- |
| Less than or equal to 0.01 percent | 10 |
| Greater than 0.01 percent and up to 0.03 percent | 9 |
| Greater than 0.03 percent and up to 0.1 percent | 8 |
| Greater than 0.1 percent and up to 0.3 percent | 7 |
| Greater than 0.3 percent and up to 1.0 percent | 6 |
| Greater than 1.0 percent and up to 3.0 percent | 5 |
| Greater than 3.0 percent and up to 10.0 percent | 4 |
| Greater than 10.0 percent and up to 16.0 percent | 3 |
| Greater than 16.0 percent and up to 33.0 percent | 2 |
| Greater than 33.0 percent and up to 50.0 percent | 1 |
| Greater than 50.0 percent | 0 |

Early Water Resistance

Coated panels were prepared by applying a test coating formulation onto Q panels (cold rolled steel) by a 100 μm applicator. The resultant films were then allowed to dry at 23° C. and RH of 50% for 1 hour. Then the coated panels were dipped into deionized (DI) water for 7 days before recording the degree of rust and blister. The degree of rust and blister was evaluated and recorded according to ASTM D610-2001 and ASTM D714-02 (2010), respectively. Panels with blister rating of 10 and rust rating of 10 for early water resistance tests are acceptable.

GPC Analysis

GPC analysis was performed generally by Agilent 1200. A sample was dissolved in tetrahydrofuran (THF)/formic acid (FA) (5%) with a concentration of 2 mg/mL, stirred for over one hour, stored at room temperature (20-35° C.) overnight, and then filtered through 0.45 μm polytetrafluoroethylene (PTFE) filter prior to GPC analysis. The GPC analysis was conducted using the following conditions:

Column: One PLgel GUARD column (10 μm, 50 mm×7.5 mm), Two Mixed B columns (7.8 mm×300 mm) in tandem; column temperature: 40° C.; mobile phase: THF/FA (5%); flow rate: 1.0 mL/minute; Injection volume: 100 μL; detector: Agilent Refractive Index detector, 40° C.; and calibration curve: PL Polystyrene I Narrow standards with molecular weights ranging from 2329000 to 580 g/mol, using polynom 3 fitness.

Block Resistance

Block resistance was measured according to GB/T 23982-2009. Coated panels were prepared by applying a test coating formulation onto aluminum (Al) panels by a 100 μm applicator and allowing the panels to dry at 23° C., RH of 50% overnight. Two coated panels were then stacked together face to face (coating film to coating film) with 500 g weight on top of them and then placed into an oven at 50° C. for 4 hours. The two stacked panels were then separated from each other to evaluate block resistance.

The rating for the block resistance is defined by the separating force and the area of damaging:
A: separated without any force;
B: separated by a slight blow;
C: separated by low force with hands
D: separated by medium force with hands;
E: separated by huge force with hands;
F: separated by tools
The number means the area of damage:
0: no damage; 1: ≤1%; 2: >1 and ≤5%; 3: >5 and ≤20%; 4: >20 and ≤50%; 5: >50%
A-0 represents the best and F-5 is the worst. Block resistance better than C-3 acceptable.

Example 1

DI water (455 g), Disponil Fes 32 surfactant (31%, 25 g), ST (572 g), 2-EHA (462 g), CHMA (344 g), MAA (30 g), PEM (22 g), MEUR (50%, 22 g), and AAEM (75 g) were mixed together to produce a stable monomer emulsion.

DI water (1000 g) and Polystep P-12A Surfactant (28%, 33 g) were charged to a five-liter multi-neck flask fitted with mechanical stirring. The contents of the flask were heated to 90° C. under nitrogen atmosphere. Then, ammonia (25%, 1.3 g) in DI water (5 g), 85 g of the monomer emulsion and APS (2.95 g) in DI water (16.67 g) were added to the stirred flask, followed by a rinse of DI water (5 g). The remaining monomer emulsion, APS (1.75 g) in DI water (98.33 g) and ammonia (25%, 8.0 g) in DI water (93.33 g) were then added at 88° C. over 120 minutes, followed by a rinse of DI water (25 g). At the end of polymerization, $FeSO_4$ (0.0122 g) in DI water (5.75 g) mixed with ethylenediamine tetraacetic acid sodium salt (0.0229 g) in DI water (5.75 g), a solution of t-butyl hydroperoxide (3.89 g) in DI water (30.83 g) and a solution of sodium formaldehyde sulfoxylate (2.44 g) in DI water (30 g), a solution of t-butyl hydroperoxide (3.44 g) in DI water (25 g), and a solution of sodium formaldehyde sulfoxylate (2.0 g) in DI water (27 g) were all added to the flask at 60° C., and then ammonia (25%, 14 g) in DI water (15 g) was added at 50° C. to obtain an aqueous dispersion.

Example 2-5 and 7

Aqueous dispersions of Exs 2-5 and 7 were prepared, respectively, according to the same procedure as described above for preparing the aqueous dispersion of Ex 1, based on monomer formulations and the dosage of n-DDM as given in Table 1.

Example 6

The aqueous dispersion of Ex 6 was prepared by mixing the as prepared aqueous dispersion of Ex 3 with 0.35% of Silquest A-187 silane by weight based on solids weight of the aqueous dispersion of Ex 3.

Comparative (Comp) Examples A, D, F and G

These aqueous dispersions were prepared, respectively, according to the same procedure as described above for preparing the aqueous dispersion of Ex 1, based on monomer formulations and the dosage of n-DDM, if used, given in Table 1.

Comp Example B

DI water (455 g), Disponil Fes 32 surfactant (31%, 25 g), ST (586 g), 2-EHA (401 g), CHMA (344 g), MAA (30 g), PEM (22 g), MEUR (50%, 22 g), and DAAM (23 g) were mixed together to produce a stable monomer emulsion.

DI water (1000 g) and Polystep P-12A surfactant (28%) (33 g) were charged to a five-liter multi-neck flask fitted with mechanical stirring. The contents of the flask were heated to 90° C. under nitrogen atmosphere. Then, ammonia (25%, 1.3 g) in DI water (5 g), 85 g of the monomer emulsion and APS (2.95 g) in DI water (16.67 g) were added to the flask, followed by a rinse of DI water (5 g). The remaining monomer emulsion, APS (1.75 g) in DI water (98.33 g) and ammonia (25%, 8.0 g) in DI water (93.33 g) were then added at 88° C. over 120 minutes, followed by a rinse of DI water (25 g). At the end of polymerization, $FeSO_4$ (0.0122 g) in DI water (5.75 g) mixed with ethylenediamine tetraacetic acid sodium salt (0.0229 g) in DI water (5.75 g), a solution of t-butyl hydroperoxide (3.89 g) in DI water (30.83 g) and a solution of sodium formaldehyde sulfoxylate (2.44 g) in DI water (30 g), a solution of t-butyl hydroperoxide (3.44 g) in DI water (25 g), and a solution of sodium formaldehyde sulfoxylate (2.0 g) in DI water (27 g) were all added to the flask at 60° C., and then ammonia (25%, 14 g) in DI water (15 g) was added at 50° C. Finally, ADH (14 g) in DI water (20 g) was added at 45° C. to obtain an aqueous dispersion.

Comp Example C

DI water (455 g), Disponil Fes 32 surfactant (31%, 25 g), ST (586 g), 2-EHA (401 g), CHMA (344 g), MAA (30 g), PEM (22 g), MEUR (50%, 22 g), and DAAM (23 g) were mixed together to produce a stable monomer emulsion.

DI water (1000 g) and Polystep P-12A Surfactant (28%) (33 g) were charged to a five-liter multi-neck flask fitted with mechanical stirring. The contents of the flask were heated to 90° C. under nitrogen atmosphere. Then, ammonia (25%, 1.3 g) in DI water (5 g), 85 g of the monomer emulsion, and APS (2.95 g) in DI water (16.67 g) were added, followed by a rinse of DI water (5 g). The remaining monomer emulsion, APS (1.75 g) in DI water (98.33 g) and ammonia (25%, 8.0 g) in DI water (93.33 g) were then added at 88° C. over 120 minutes, followed by a rinse of DI water (25 g). At the end of polymerization, FeSO$_4$ (0.0122 g) in DI water (5.75 g) together with ethylenediamine tetraacetic acid sodium salt (0.0229 g) in DI water (5.75 g), a solution of t-butyl hydroperoxide (3.89 g) in DI water (30.83 g) and a solution of sodium formaldehyde sulfoxylate (2.44 g) in DI water (30 g), a solution of t-butyl hydroperoxide (3.44 g) in DI water (25 g), and a solution of sodium formaldehyde sulfoxylate (2.0 g) in DI water (27 g) were all added to the flask at 60° C., and then ammonia (25%, 14 g) in DI water (15 g) was added at 50° C. Finally, ADH (21 g) in DI water (30 g) was added at 45° C. to obtain an aqueous dispersion.

Comp Example E

DI water (455 g), Disponil Fes 32 surfactant (31%, 25 g), ST (586 g), 2-EHA (401 g), CHMA (344 g), MAA (30 g), PEM (22 g), MEUR (50%, 22 g), and DAAM (23 g) were mixed together to produce a stable monomer emulsion.

DI water (1000 g) and Polystep P-12A surfactant (28%) (33 g) were charged to a five-liter multi-neck flask fitted with mechanical stirring. The contents of the flask were heated to 90° C. under nitrogen atmosphere. Then, ammonia (25%, 1.3 g) in DI water (5 g), 85 g of the monomer emulsion and APS (2.95 g) in DI water (16.67 g) were added to the flask, followed by a rinse of DI water (5 g). The remaining monomer emulsion, APS (1.75 g) in DI water (98.33 g), and ammonia (25%, 8.0 g) in DI water (93.33 g) were then added at 88° C. over 120 minutes, followed by a rinse of DI water (25 g). At 60 minutes, a large amount of coagulum was observed in the flask and the experiment was stopped.

Compositions and properties of the above obtained aqueous dispersions are given in Table 1.

Paint Formulations—Paint-1, Comp Paint A-I, Comp Paint B, and Comp Paint C

The above obtained aqueous dispersions were used as binders in preparing paint formulations, based on formulations given in Table 2. The ingredients in the grind stage were mixed using a high speed disperser (mixing speed: 800-1800 revolutions per minute (rpm)). Then the obtained grind was mixed with the binder using a conventional lab mixer (mixing speed: 50-600 rpm). Then other ingredients in the letdown stage were added to obtain the paint formulations. The obtained paint formulations were evaluated according to the test methods described above. Properties of the obtained paints are given in Table 2.

TABLE 2

Paint formulations and properties of paints

|  |  | Paint-1 | Comp Paint A-I | Comp Paint B | Comp Paint C |
|---|---|---|---|---|---|
| Grind |  |  |  |  |  |
|  | Water | 42.00 | 42.00 | 42.00 | 42.00 |
|  | OROTAN 681 | 7.80 | 7.80 | 7.80 | 7.80 |
|  | Surfynol TG | 1.99 | 1.99 | 1.99 | 1.99 |
|  | Aqueous ammonia (25%) | 1.99 | 1.99 | 1.99 | 1.99 |
|  | Tego Airex 902W | 0.46 | 0.46 | 0.46 | 0.46 |
|  | Ti-Pure R-706 | 209.24 | 209.24 | 209.24 | 209.24 |
|  | Water | 42.00 | 42.00 | 42.00 | 42.00 |
| Letdown |  |  |  |  |  |
| Binder | Ex 1 dispersion | 604.60 |  |  |  |
|  | Comp Ex A dispersion |  | 604.60 |  |  |
|  | Comp Ex B dispersion |  |  | 604.60 |  |
|  | Comp Ex C dispersion |  |  |  | 604.60 |
|  | Water | 17.12 | 21.00 | 21.00 | 21.00 |
|  | Aqueous ammonia (25%) | 4.00 | 4.00 | 4.00 | 4.00 |
|  | Sodium nitrite (15%) | 8.97 | 8.97 | 8.97 | 8.97 |

TABLE 1

Compositions and properties of aqueous dispersion

|  | Emulsion polymer Composition | Post addition | pH | Solids, % | Particle size, nm | Mw |
|---|---|---|---|---|---|---|
| Ex 1 | 30.51EHA/37.68ST/2MAA/22.63CHMA/5AAEM/1.49PEM/0.69MEUR | — | 7.24 | 41.92 | 85 | 439160 |
| Ex 2 | 31.76EHA/38.91ST/2.01MAA/22.63CHMA/1.50PEM/2.5AAEM/0.69MEUR | — | 7.24 | 42.48 | 82 | 383695 |
| Ex 3 | 31.76EHA/38.91ST/2.01MAA/22.63CHMA/1.50PEM/2.5AAEM/0.69MEUR//0.15n-DDM | — | 7.59 | 42.14 | 81 | 386590 |
| Ex 4 | 32.52EHA/39.66ST/1AAEM/2.0MAA/22.63CHMA/1.50PEM/0.69MEUR | — | 7.45 | 42.32 | 91 | 335220 |
| Ex 5 | 33.8EHA/53.5ST/2.01MAA/6CHMA/1.50PEM/2.5AAEM/0.69MEUR//0.15n-DDM | — | 7.79 | 42.18 | 84 | 395670 |
| Ex 6 | 31.76EHA/38.91ST/2.01MAA/22.63CHMA/1.50PEM/2.5AAEM/0.69MEUR//0.15n-DDM | 0.35% A-187 | 7.59 | 42.14 | 81 | 386590 |
| Ex 7 | 32.77EHA/45.53ST/2.01MAA/15CHMA/1.50PEM/2.5AAEM/0.69MEUR//0.15n-DDM | — | 7.79 | 41.49 | 83 | 398430 |
| Comp Ex A | 33.24EHA/39.95ST/2MAA/22.63CHMA/1.49PEM/0.69MEUR | — | 7.73 | 42.35 | 82 | 317270 |
| Comp Ex B | 33.03EHA/38.65ST/2MAA/22.63CHMA/1.5DAAM/1.50PEM/0.69MEUR | 0.6% ADH | 7.97 | 42.03 | 84 |  |
| Comp Ex C | 33.03EHA/38.65ST/2MAA/22.63CHMA/1.5DAAM/1.50PEM/0.69MEUR | 0.9% ADH | 7.99 | 42.29 | 84 |  |
| Comp Ex D | 31.76EHA/38.91ST/2MAA/22.63CHMA/1.50PEM/2.5AAEM/0.69MEUR//0.30n-DDM | — | 7.42 | 42.29 | 83 | 149720 |
| Comp Ex F | 33.80EHA/58.01ST/2.85MAA/2.15PEM/2.5AAEM/0.69MEUR//0.15n-DDM | — | 7.71 | 42.27 | 85 |  |
| Comp Ex G | 30.27EHA/23.02ST/2.01MAA/40.01CHMA/1.50PEM/2.5AAEM/0.69MEUR//0.15n-DDM | — | 7.60 | 41.39 | 83 |  |

*Numbers separated by a single slash indicates weight percentage of structural units of monomers in the emulsion polymer, based on the weight of the emulsion polymer.

TABLE 2-continued

Paint formulations and properties of paints

|  | Paint-1 | Comp Paint A-I | Comp Paint B | Comp Paint C |
|---|---|---|---|---|
| ACRYSOL RM-8W | 1.40 | 1.10 | 1.10 | 1.10 |
| Texanol | 48.24 | 44.36 | 44.36 | 44.36 |
| Properties |  |  |  |  |
| Early water resistance | 10 | 10 | 8MD | 8F |
| 258 hour-salt spray resistance (blister/rust) | 10/10 | 4MD/10 | 4F/8S | 4F/10 |

As shown in Table 2, Ex 1 dispersion provided Paint-1 with the best salt spray resistance among all the testing paints. Moreover, paints comprising binders with ADH as post crosslinking agents (Comp Exs B and C) showed worse early water resistance than paints prepared from a binder without the post crosslinking agent (Comp Ex A) or paints with a binder comprising structural units of AAEM (Ex 1).

Paint Formulations—Paint-2, Paint-3-I, Comp Paint A-II, and Comp Paint D

These paint formulations were prepared according to the same procedure as Paint-1 described above, based on formulations given in Table 3. Properties of the obtained paints are given in Table 3. As shown in Table 3, all binders provided paints with acceptable early water resistance. Exs 2 and 3 dispersions provided paints with better salt spray resistance than Comp Ex D dispersion. Ex 3 dispersion provided paints with even better than salt spray resistance than Ex 2 dispersion. In addition, Exs 2 and 3 dispersions both provided paints with better block resistance than Comp Ex A and Comp Ex D dispersions.

TABLE 3

Paint formulations and properties of paints

|  |  | Paint-2 | Paint-3-I | Comp Paint A-II | Comp Paint D-I |
|---|---|---|---|---|---|
| Grind |  |  |  |  |  |
| Water |  | 42.00 | 42.00 | 42.00 | 42.00 |
| OROTAN 681 |  | 7.80 | 7.80 | 7.80 | 7.80 |
| Surfynol TG |  | 1.99 | 1.99 | 1.99 | 1.99 |
| Aqueous ammonia (25%) |  | 1.99 | 1.99 | 1.99 | 1.99 |
| Tego Airex 902W |  | 0.46 | 0.46 | 0.46 | 0.46 |
| Ti-Pure R-706 |  | 209.24 | 209.24 | 209.24 | 209.24 |
| Water |  | 42.00 | 42.00 | 42.00 | 42.00 |
| Letdown |  |  |  |  |  |
| Binder | Ex 2 dispersion | 604.60 |  |  |  |
|  | Ex 3 dispersion |  | 604.60 |  |  |
|  | Comp Ex A dispersion |  |  | 604.60 |  |
|  | Comp Ex D dispersion |  |  |  | 604.60 |
| Water |  | 18.36 | 18.36 | 21.00 | 23.44 |
| Aqueous ammonia (25%) |  | 4.00 | 4.00 | 4.00 | 4.00 |
| Sodium nitrite (15%) |  | 8.97 | 8.97 | 8.97 | 8.97 |
| ACRYSOL RM-8W |  | 1.10 | 1.10 | 1.10 | 1.10 |
| Texanol |  | 47.00 | 48.27 | 44.36 | 47.00 |
| Properties |  |  |  |  |  |
| Early water resistance |  | 10 | 10 |  | 10 |
| 230 hour-salt spray resistance of non-scribed panel (blister/rust) |  | 8F/10 | 6F/10 |  | 6F/8P |
| Block resistance |  | C1 | C2 | E3 | D3 |

Paint Formulations—Paint-4 and Comp Paint A-III

These paint formulations were prepared according to the same procedure as Paint-1 described above, based on formulations given in Table 4. Properties of the obtained paints are given in Table 4. As shown in Table 4, Ex 4 dispersion provided paints with comparable early water resistance and better salt spray resistance than Comp Ex A dispersion.

TABLE 4

Paint formulations and salt spray resistance performance

|  |  | Paint-4 | Comp Paint A-III |
|---|---|---|---|
| Grind |  |  |  |
| Water |  | 42.00 | 42.00 |
| OROTAN 681 |  | 7.80 | 7.80 |
| Surfynol TG |  | 1.99 | 1.99 |
| Aqueous ammonia (25%) |  | 1.99 | 1.99 |
| Tego Airex 902W |  | 0.46 | 0.46 |
| Ti-Pure R-706 |  | 209.24 | 209.24 |
| Water |  | 42.00 | 42.00 |
| Letdown |  |  |  |
| Binder | Ex 4 dispersion | 604.60 |  |
|  | Comp Ex A dispersion |  | 604.60 |
| Water |  | 16.48 | 21.00 |
| Aqueous ammonia (25%) |  | 4.00 | 4.00 |
| Sodium nitrite (15%) |  | 8.97 | 8.97 |
| ACRYSOL RM-8W |  | 1.10 | 1.10 |
| Texanol |  | 48.88 | 44.36 |
| Properties |  |  |  |
| Early water resistance |  | 10 | 10 |
| 270 hour-salt spray resistance of non-scribed panel (blister/rust) |  | 6F/10 | 2M/10 |

Paint Formulations—Paint-3-II, Paint-5, Paint-6, Paint-7, Comp Paint F, and Comp Paint G These paint formulations were prepared according to the same procedure as Paint-1 described above, based on formulations given in Table 5. Properties of the obtained paints are given in Table 5. As shown in Table 5, Exs 3 and 5-7 dispersions provided paints with comparable early water resistance, and better salt spray resistance after 270 hours of exposure to salt spray when coated on panels (no scribe) than Comp Exs F and G dispersion, where Ex 6 dispersion provided paints with the best salt spray resistance. In addition, Exs 3, 6 and 7 dispersions maintained good salt spray resistance even after 400 hours of exposure to salt spray when coated on scribed panels.

TABLE 5

Paint formulations and salt spray resistance performance

|  |  | Paint-3-II | Paint-5 | Paint-6 | Paint-7 | Comp Paint F | Comp Paint G |
|---|---|---|---|---|---|---|---|
| Grind |  |  |  |  |  |  |  |
|  | Water | 42.00 | 42.00 | 42.00 | 42.00 | 42.00 | 42.00 |
|  | OROTAN 681 | 7.80 | 7.80 | 7.80 | 7.80 | 7.80 | 7.80 |
|  | Surfynol TG | 1.99 | 1.99 | 1.99 | 1.99 | 1.99 | 1.99 |
|  | Aqueous ammonia (25%) | 1.99 | 1.99 | 1.99 | 1.99 | 1.99 | 1.99 |
|  | Tego Airex 902W | 0.46 | 0.46 | 0.46 | 0.46 | 0.46 | 0.46 |
|  | Ti-Pure R-706 | 209.24 | 209.24 | 209.24 | 209.24 | 209.24 | 209.24 |
|  | Water | 42.00 | 42.00 | 42.00 | 42.00 | 42.00 | 42.00 |
| Letdown |  |  |  |  |  |  |  |
| Binder | Ex 3 dispersion | 604.60 |  |  |  |  |  |
|  | Ex 5 dispersion |  | 604.60 |  |  |  |  |
|  | Ex 6 dispersion |  |  | 604.60 |  |  |  |
|  | Ex 7 dispersion |  |  |  | 604.60 |  |  |
|  | Comp Ex F dispersion |  |  |  |  | 604.60 |  |
|  | Comp Ex G dispersion |  |  |  |  |  | 604.60 |
|  | Water | 18.36 | 19.63 | 18.36 | 18.36 | 16.72 | 19.63 |
|  | Aqueous ammonia (25%) | 4.00 | 4.00 | 4.00 | 4.00 | 4.00 | 4.00 |
|  | Sodium nitrite (15%) | 8.97 | 8.97 | 8.97 | 8.97 | 8.97 | 8.97 |
|  | ACRYSOL RM-8W | 1.10 | 1.30 | 1.10 | 1.30 | 1.30 | 1.30 |
|  | Texanol | 48.27 | 47.00 | 48.27 | 48.07 | 49.91 | 47.00 |
| Properties |  |  |  |  |  |  |  |
|  | Early water resistance | 10 | 10 | 10 | 10 | 10 | 10 |
|  | 270 hour-salt spray resistance of non-scribed panel (blister/rust) | 6F/10 | 6F/10 | 8F/10 | 6F/10 | 4M/8P | 4M/10 |
|  | 400 hour-salt spray resistance of scribed panel (blister/rust) | 6F/10 | 4F/9P | 8F/10 | 6F/10 |  |  |

What is claimed is:

1. An aqueous dispersion comprising an emulsion polymer, wherein the emulsion polymer comprises, by weight based on the weight of the emulsion polymer,
   (a) structural units of a phosphorous acid monomer and/or a salt thereof,
   (b) from 5% to less than 40% of structural units of a cycloalkyl (meth)acrylate,
   (c) from 0.8% to 5% of structural units of an acetoacetoxy or acetoacetamide functional monomer, and
   (d) structural units of a hydrophobic monomer wherein the hydrophobic monomer comprises styrene or substituted styrene in an amount of at least 30%, based on the weight of the emulsion polymer;
   wherein the emulsion polymer has a weight average molecular weight of 160,000 g/mol or more.

2. The aqueous dispersion of claim 1, wherein the emulsion polymer further comprises structural units of an ethylenically unsaturated monomer having one or more functional groups selected from ureido, amide, amino, silane, hydroxyl, or combinations thereof.

3. The aqueous dispersion of claim 1, wherein the emulsion polymer has a weight average molecular weight of from 200,000 to 500,000 g/mol.

4. The aqueous dispersion of claim 1, wherein the phosphorous acid monomer is selected from the group consisting of phosphoethyl methacrylate, phosphoethyl acrylate, allyl ether phosphate, or mixtures thereof.

5. The aqueous dispersion of claim 1, wherein the emulsion polymer comprises, by weight based on the weight of the emulsion polymer, from 0.5% to 3% of structural units of the phosphorous acid monomer and/or salt thereof.

6. The aqueous dispersion of claim 1, wherein the acetoacetoxy or acetoacetamide functional monomer is selected from the group consisting of acetoacetoxyethyl methacrylate, acetoacetoxyethyl acrylate, acetoacetoxypropyl methacrylate, allyl acetoacetate, acetoacetoxybutyl methacrylate, 2,3-di(acetoacetoxy)propyl methacrylate, or mixtures thereof.

7. The aqueous dispersion of claim 1, wherein the emulsion polymer comprises, by weight based on the weight of the emulsion polymer, from 1.5% to 4% of structural units of the acetoacetoxy or acetoacetamide functional monomer.

8. The aqueous dispersion of claim 1, wherein the emulsion polymer comprises, by weight based on the weight of the emulsion polymer, from 10% to 30% of structural units of the cycloalkyl (meth)acrylate.

9. The aqueous dispersion of claim 1, wherein the cycloalkyl (meth)acrylate is cyclohexyl methacrylate, cyclohexyl acrylate, or a mixture thereof.

10. The aqueous dispersion of claim 1, further comprising an epoxy functional silane.

11. The aqueous dispersion of claim 1, wherein the hydrophobic monomer is selected from the group consisting of styrene, substituted styrene, 2-ethylhexylacrylate, butyl methacrylate, tert-butyl methacrylate, tert-butyl acrylate, or mixtures thereof.

12. An aqueous dispersion comprising an emulsion polymer, wherein the emulsion polymer comprises, by weight based on the weight of the emulsion polymer,
   (a) structural units of a phosphorous acid monomer and/or a salt thereof,
   (b) from 5% to less than 40% of structural units of a cycloalkyl (meth)acrylate,
   (c) from 0.8% to 5% of structural units of an acetoacetoxy or acetoacetamide functional monomer, and
   (d) structural units of a hydrophobic monomer,
   wherein the emulsion polymer has a weight average molecular weight of 160,000 g/mol or more, wherein the emulsion polymer has a glass transition temperature of from 0 to 60° C.

13. The aqueous dispersion of claim 1, wherein the emulsion polymer comprises, by weight based on the weight of the emulsion polymer,

- from 0.5% to 3% of structural units of the phosphorous-acid monomer and/or salt thereof;
- from 10% to 30% of structural units of the cycloalkyl (meth)acrylate,
- from 1.5% to 4% of structural units of the acetoacetoxy or acetoacetamide functional monomer,
- from 30% to 50% of structural units of styrene or substituted styrene, and
- from 20% to 40% of structural units of the $C_4$-$C_{12}$-alkyl (meth)acrylate.

14. A process of preparing an aqueous dispersion of claim 1 by polymerization process, wherein the aqueous dispersion comprises an emulsion polymer comprising, by weight based on the weight of the emulsion polymer, (a) structural units of a phosphorous acid monomer and/or a salt thereof,
(b) from 5% to less than 40% of structural units of a cycloalkyl (meth)acrylate,
(c) from 0.8% to 5% of structural units of an acetoacetoxy or acetoacetamide functional monomer, and
(d) structural units of a hydrophobic monomer;
wherein the emulsion polymer has a weight average molecular weight of 160,000 g/mol or more.

15. An aqueous coating composition comprising an aqueous dispersion of claim 1.

* * * * *